Dec. 12, 1950     L. COUILLARD     2,533,769
RADIO ALTIMETER
Filed Oct. 9, 1947
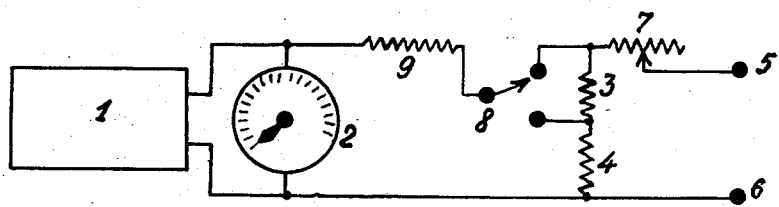
INVENTOR
LOUIS COUILLARD,
by John B. Brady
ATTORNEY

UNITED STATES PATENT OFFICE 2,533,769

RADIO ALTIMETER

Louis Couillard, Paris, France, assignor to Societe Francaise Radio Electrique, a corporation of France Application October 9, 1947, Serial No. 778,803
In France October 22, 1946

1 Claim. (Cl. 343—12)

This invention relates to radio altimeters, that is to say, to appliances enabling the absolute height of an aircraft above the ground to be ascertained by measuring the time taken by the outward and return journey of a wave emitted by the aircraft and received back by the aircraft after reflection from the ground.

In the majority of these appliances the altitude indicator is constituted by a galvanometer traversed by a current furnished by the receiver. This current is substantially proportional to the duration of the journey of the reflected wave, and consequently to the height of the aircraft above the ground. Such a galvanometer is disclosed in my copending application Serial Number 731,194, filed February 27, 1947, which issued as Patent No. 2,513,454 on July 4, 1950.

The emitting and receiving aerials are fixed at definite points on the aircraft, usually beneath the wings, so that when the aeroplane is on the ground these aerials are already located at a certain height.

Under these conditions the indicator is traversed by a rest current $I_0$ corresponding to the position of the aircraft on the ground. The zero of the graduation therefore does not coincide with the mechanical zero of the indicator.

The current $I_0$ being proportional to the height of the wings of the aircraft, an indicator designed for a definite height of wings cannot be utilized on an aircraft in which the wing height is different.

Furthermore, when the altimeter comprises two reading scales of ratio $k$, the currents $I_0$ and $I'_0$ corresponding to the same altitude on the two scales are in the ratio $k$. The rest current $I'_0$ of the first scale is therefore $k$ times as strong as the rest current $I_0$ of the second scale, and the same graduation cannot be utilized for both scales without involving a reading error proportional to $I_0-I'_0$.

The present invention eliminates these disadvantages by applying to the indicator a compensating voltage which suppresses the rest currents $I_0$ and $I'_0$ when the aircraft is on the ground.

The regulating of the rest current renders it possible to make the zero of the graduation coincide with the mechanical zero of the indicator whatever may be the wing height of the aircraft. Hence this arrangement enables a single graduation to be utilized for the two reading scales, and for any type of aircraft.

The invention is illustrated by way of example in the accompanying drawing, which represents diagrammatically one form of construction of the invention.

In the drawing, 1 denotes the receiver of the radio altimeter, which delivers into the indicator 2. The compensating voltage is obtained from a potential-divider consisting of resistances 3 and 4. This voltage is obtained from a fixed voltage applied between terminals 5 and 6.

A rheostat 7 enables the compensation voltage to be adjusted as a function of the height of the aircraft wings.

Finally a switch 8, mechanically coupled to the switch that changes the scale of the altimeter, connects the indicator 2, through a resistance 9, to the appropriate point of the potentiometer 3, 4, according to the scale utilized.

When the scale for low altitudes is being utilized, the compensation voltage is taken from the terminals of the two resistances 3 and 4 in series; and when the scale for high altitudes is being used, the compensation voltage is taken from the terminals of the resistance 4 only.

The values of resistances 3 and 4 are advantageously made negligibly small in comparison with that of the resistance 9. The ratio of the resistance 3 to the resistance 4 is then equal to $k-1$.

When the galvanometer indicator comprises a shunt, the latter may advantageously be constituted by the resistance 9, so as to obviate a reduction of sensitiveness due to the shunt current in the resistance 9.

Although the invention has been described as applied to a particular example of construction, it is in no way limited thereto, and is on the contrary susceptible of numerous modifications and adaptations without going outside its ambit. Thus for example, instead of comprising two reading scales, the apparatus might comprise only one scale; or it might comprise more than two scales. In the first case the potential-divider would be replaced by a single resistance, the switch 8 would be omitted, and the corresponding end of the resistance 9 would be connected to the point that is common to the resistance replacing the potential-divider and to the rheostat 7. In the second case the potential-divider would comprise as many resistances, and the switch 8 as many positions, as the apparatus comprises reading scales.

Similarly the composite unit consisting of the resistance 9, the potentiometer and the rheostat 7 might be replaced, without going outside the ambit of the invention, by a network of different structure enabling the same result to be obtained, for instance a constant-impedance attenuator.

I claim:

In a radio-altimeter mounted on an aircraft provided with a fixed antenna and with an indicating output ammeter through which flows a unidirectional current whose mean intensity is substantially proportional to the height of the aircraft above the earth surface, means for applying to the terminals of said ammeter an adjustable direct compensating voltage creating a current whose direction is opposite to that of the aforesaid current and whose intensity is equal to that which corresponds to the position of the aircraft when resting on the ground, said ammeter having several scales and being connected to a high resistance in series with a compensating low resistance voltage divider, contacts connected with spaced taps on said voltage divider, a switch selectively movable over said contacts and included in the electrical circuit through said high resistance, each of said contacts being selectively connectible for coaction with the individual scales on said ammeter, a supply circuit and a variable resistor connecting said supply circuit with said voltage divider.

LOUIS COUILLARD.

REFERENCES CITED

The following references are of record in the file of this patent:

UNITED STATES PATENTS

| Number | Name | Date |
| --- | --- | --- |
| 1,942,594 | Edwards | Jan. 9, 1934 |
| 1,987,587 | Drake | Jan. 8, 1935 |
| 1,987,588 | Drake | Jan. 8, 1935 |
| 2,208,329 | Morelock | July 16, 1940 |